E. F. BEUGLER.
BARREL HEAD SHAPING MACHINE.
APPLICATION FILED FEB. 23, 1912.

1,063,497.

Patented June 3, 1913.

Witnesses.
K. A. Landis
Carl Schramm

Edwin F. Beugler     Inventor
By   A. J. Langston   Attorney

E. F. BEUGLER.
BARREL HEAD SHAPING MACHINE.
APPLICATION FILED FEB. 23, 1912.

1,063,497.

Patented June 3, 1913.

Witnesses.

Edwin F. Beugler Inventor.

By

Attorney

E. F. BEUGLER.
BARREL HEAD SHAPING MACHINE.
APPLICATION FILED FEB. 23, 1912.

1,063,497.

Patented June 3, 1913.

Witnesses.
K. A. Landis
Carl Schramm

Edwin F. Beugler   Inventor.
By A. J. Sangster   Attorney

E. F. BEUGLER.
BARREL HEAD SHAPING MACHINE.
APPLICATION FILED FEB. 23, 1912.

1,063,497.

Patented June 3, 1913.

Witnesses.
K. A. Landis
Carl Schramm

Edwin F. Beugler  Inventor.
By ........... Attorney

E. F. BEUGLER.
BARREL HEAD SHAPING MACHINE.
APPLICATION FILED FEB. 23, 1912.

1,063,497.

Patented June 3, 1913.

Witnesses.
K. A. Landis.
Carl Schramm.

Edwin F Beugler Inventor.
By  Attorney

UNITED STATES PATENT OFFICE.

EDWIN F. BEUGLER, OF BUFFALO, NEW YORK, ASSIGNOR TO E. & B. HOLMES MACHINERY COMPANY, OF BUFFALO, NEW YORK, A CORPORATION OF NEW YORK.

BARREL-HEAD-SHAPING MACHINE.

1,063,497.  Specification of Letters Patent.  Patented June 3, 1913.

Application filed February 23, 1912.  Serial No. 679,411.

*To all whom it may concern:*

Be it known that I, EDWIN F. BEUGLER, a citizen of the United States, residing at Buffalo, in the county of Erie and State of New York, have invented certain new and useful Improvements in Barrel-Head-Shaping Machines, of which the following is a specification.

This invention relates to a machine for cutting and shaping articles and primarily to a machine of that class for cutting and shaping the heads employed to close the ends of barrels, casks, kegs and the like.

Among the features of the invention are a work supporting mechanism which is arranged so that it can be turned, a plurality of cutting mechanisms arranged relatively to the work supporting mechanism and adapted to simultaneously operate against work held in said work supporting mechanism when said work supporting mechanism is turned or swung in a curved path to bring the surface of the work in cutting contact with the cutting mechanisms, mechanism for adjusting the cutting curve and thereby varying the circumferential form of the completed head, and mechanism for regulating the angle and depth of the cut.

The main object of the invention is to produce a machine of this class which is power operated and manually controlled and thus is as nearly automatic as possible, in which the work is supported conspicuously in sight of the operator, in which the work can be quickly clamped in its supporting mechanism or released therefrom, and in which the mechanisms can be conveniently and almost instantly adjusted to change the curve of the cut. However the invention is not to be considered as limited to the above stated mechanisms as their order of operation on heads might be altered, changed or varied or some of said mechanisms might be altogether omitted or dispensed with without rendering the mechanism inoperative or incomplete. For instance where it is desired to cut and shape articles to the same identical fixed form, the curve adjusting and angle and depth regulating mechanisms could be omitted.

While the above stated features are the most important features of the invention it should be understood that the invention also consists in certain other novel mechanisms and details of construction which will be fully and clearly hereinafter described and claimed, reference being had to the accompanying drawings consisting of six sheets in which,—

In referring to the drawings in detail, like numerals designate like parts.

This improved machine is utilized for cutting and shaping objects and articles of wood or other suitable material; and, in brief, it consists of work supporting mechanism, cutting mechanism, and manual means for turning the work supporting mechanism to move the work clamped therein into cutting contact with the cutting mechanism. The specific type of the improved machine shown in the accompanying drawings is designed to cut and shape the surrounding edges of heads employed to close the ends of barrels, kegs and other packages and it is so constructed and arranged that a head can be quickly clamped in place, brought into cutting contact and then released and removed after it is cut and shaped.

In the following description, the machine frame will be first described, then the several mechanisms in the order of their operation, and finally the operation of the machine and also the manner of adjusting the several mechanisms.

Figure 1:
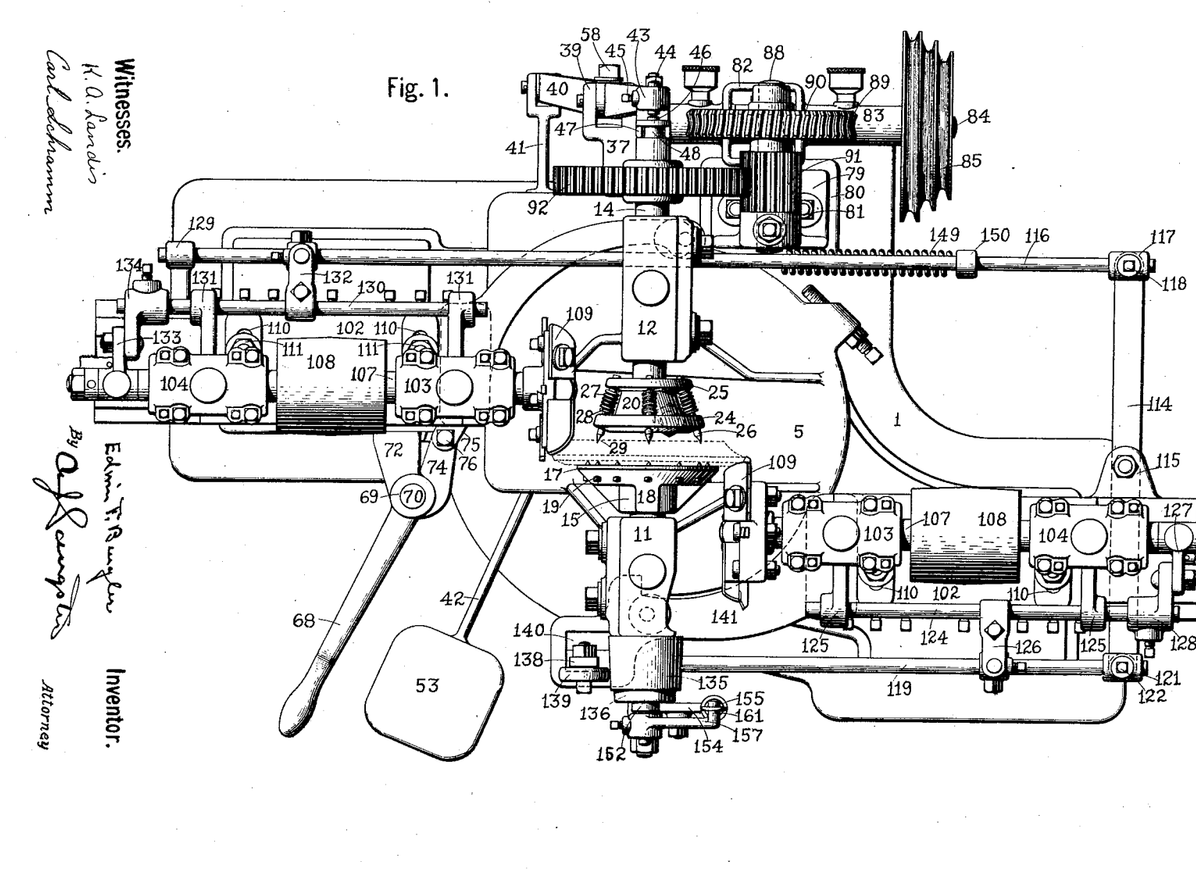
Figure 1 is a top plan view of the improved shaping machine.

*The machine frame.*—The machine frame has a comparatively flat broad base 1 and is of an elongated angular character when viewed from the top as shown in Fig. 1. Two supporting portions 2 and 3 project vertically up from the ends of the base and are enlarged at the top to form supporting beds for the carriages of cutting mechanisms as will be described more comprehensively later on. The central portion of the machine frame is provided with a short raised portion 4 as shown in Figs. 1, 2, 6, 7 and 8 of circular form on which work supporting mechanism is mounted so as to turn horizontally.

Figure 3:
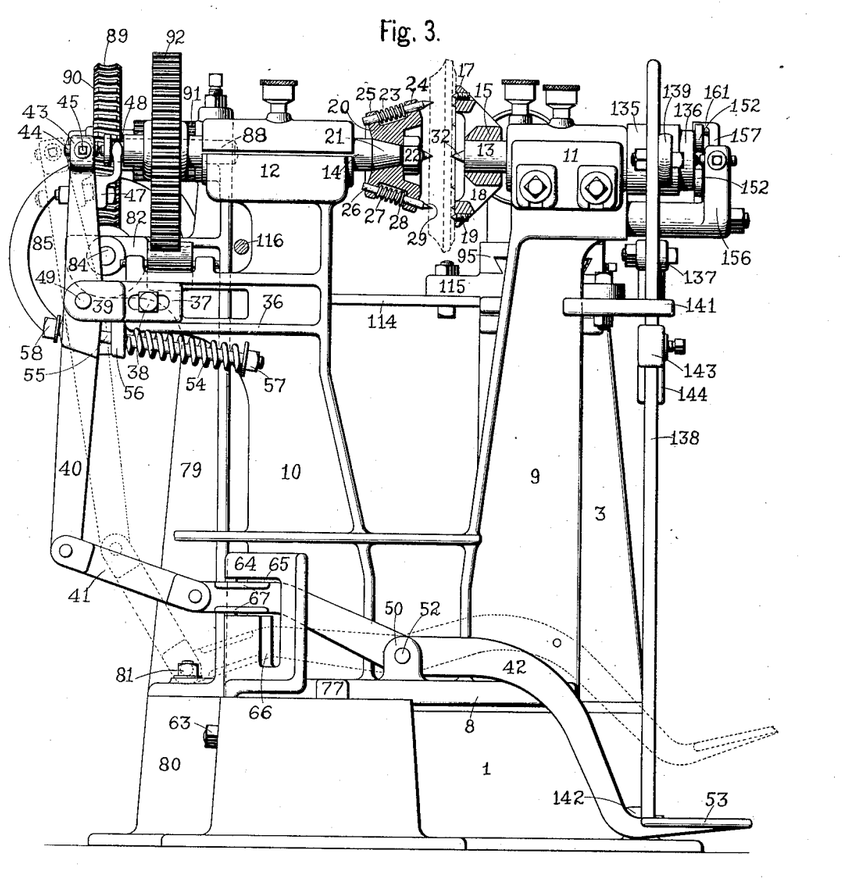
Fig. 3 is a side elevation of the improved shaping machine looking at it from the left, the cutting mechanism located on the left and the lever for swinging or turning the work supporting mechanism being removed or omitted to more clearly and completely expose the work supporting mechanism.
Figures 4, 5, 6:
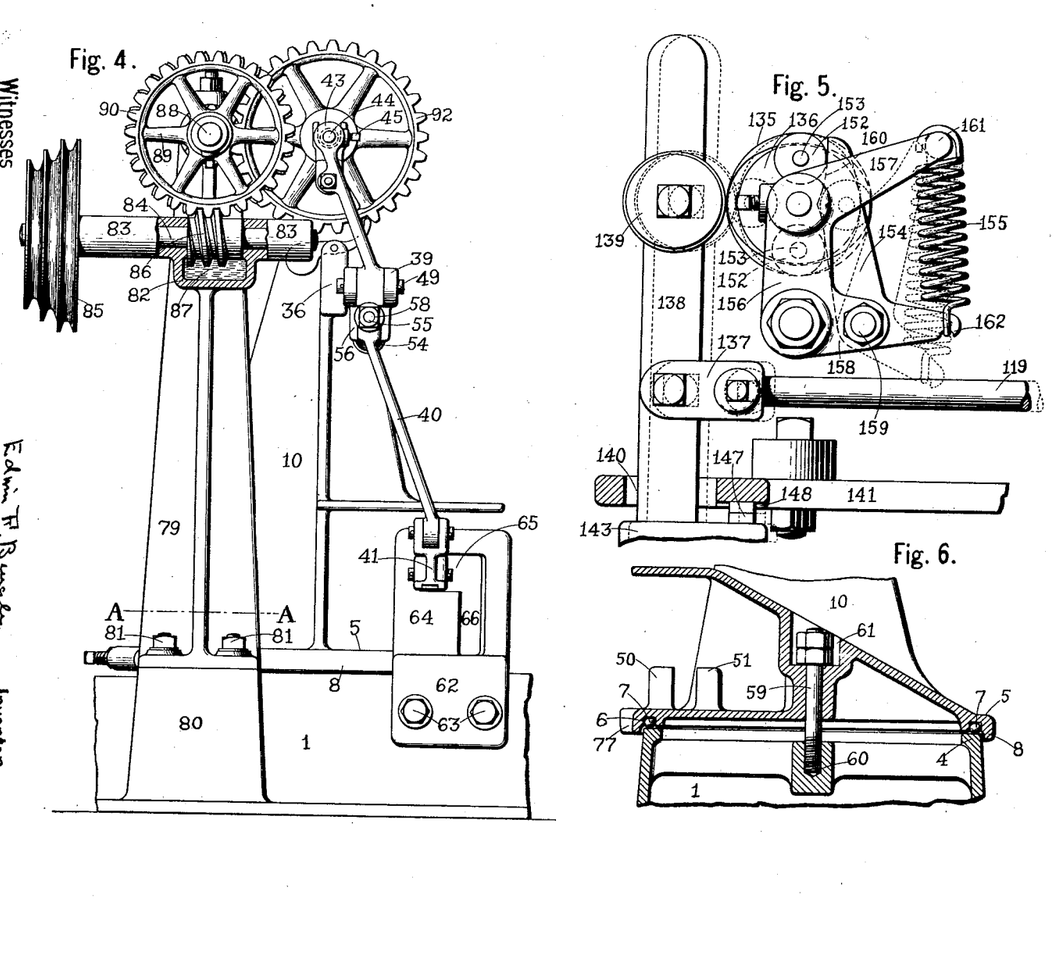
Fig. 4 is a fragmentary view of the improved shaping machine partially in rear elevation and partially in vertical section to illustrate the worm and other gearing for revolving the work, the foot operated shifting lever mechanism for the clamping elements of the work supporting mechanism, and the slotted locking block for the shifting lever mechanism.
Fig. 5 is an enlarged fragmentary view to show the cam roller, and the spring tensioned friction mechanism holding a work supporting shaft mechanism against involuntary rotation when it is out of driving engagement with the gear driving mechanism.
Fig. 6 is a fragmentary central vertical section through the lower portion of the machine frame, and the work supporting table to show the manner of moving the work supporting table on anti-friction bearings so that it can be easily turned.

*The work supporting mechanism.*—This mechanism includes a table, having a circular base 5 provided with a bearing groove 6 in its under surface in which a series of anti-friction balls 7 which contact with and roll on the upper surface of the portion 4 as shown in Fig. 6, are loosely supported. The base 5 is provided with an outer annular depending flange 8 which projects over the edges of portion 4, see Fig. 6, to prevent lateral movement of the base 5 on the portion 4. Two tapering members 9 and 10 project vertically up from the base 5 and are provided with journal boxes 11 and 12 in which two horizontal shafts 13 and 14 are respectively journaled. These two shafts will be hereinafter designated as the front and rear shafts, and are arranged in longitudinal alinement with each other as will be noted by referring more particularly to Figs. 1, 3 and 13.

Figure 13:
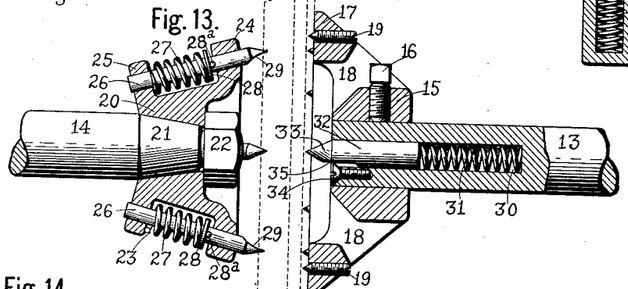
Fig. 13 is an enlarged fragmentary view partially in section of the opposed clamping members of the work supporting mechanism and the ends of the shafts on which they are mounted, also showing a barrel head held in position therein in dotted lines.
Figure 14:
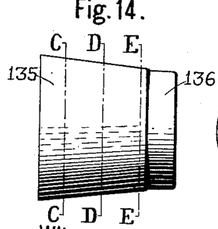
Fig. 14 is an enlarged detached side elevation of the curve controlling cam.

Two work clamping members are fastened on the respective inner ends of the two shafts 13 and 14 and in opposed position relative to each other. The opposed work clamping members are preferably constructed as shown in Fig. 13 and will be respectively designated hereafter as the front clamping member and the rear clamping member. The front clamping member consists of a hub 15 which is fitted on the inner end of the shaft 13 and fastened thereon by a set screw 16, an outer annulus or ring 17 which is concentric with the hub and is connected thereto by a series of diagonally extending radial arms 18, and a series of screws 19 arranged in screw-threaded openings located at intervals in the annulus or ring. The inner ends of the screws are cone pointed and are adapted to embed themselves in one of the side surfaces of a head, and the opposite or outer ends are provided with a groove in which the end of a screw driver or similar tool may be fitted for the purpose of adjustment. The rear clamping member has a hub 20 provided with a central tapering opening in which the tapering inner end 21 of the rear shaft 14 is fitted and rigidly secured by a lock nut 22 which is screwed on a reduced extremity of the inner end 21 of the shaft 14, as shown in Fig. 13. The outer portion of the hub 20 is tapered oppositely to the taper of its central opening and, as will be noted by referring to Fig. 13, is considerably wider than the inner portion of the hub and is provided with an intermediate annular groove 23 which is quite wide and leaves two separated outwardly extending end flanges 24 and 25. These end flanges 24 and 25 are each provided with a series of openings which are equal in number and are arranged in registering position relatively to each other and a series of pins 26 are slidably fitted in these openings, each pin having its inner portion in one of the openings in the flange 24 and its outer portion in the opening in the flange 25 which registers with the opening in the flange 24 in which the inner portion of the pin is fitted, as shown in Fig. 13. A coil spring 27 is loosely fitted around that portion of each pin 26 located in the groove 23 and has one of its ends bearing against the inner side surface of the flange 25 and its other or inner end bearing against a washer 28 loose on the shaft which presses against the oppositely projecting ends of a small pin 28ª driven through a transverse opening in the pin 26. The small transverse pins 28ª serve not only to tension the pins 26 but also to limit their inward movement by striking against the inner side surface of the flange 24 as shown in Fig. 13. It will be noted by referring to Fig. 13, the inner ends of the pins 26 are not made entirely conical as the inner portion of each pin is cut or concaved out as shown at 29 in said Fig. 13. The purpose of this is to provide a fairly broad flat slightly concaved tapering bearing surface on the inner side of each pin end which as the pin end enters the wood of the head will press against and tend to force the head parts more firmly toward each other. This peculiar forcing together tendency of the pins 26 is greatly assisted by their arrangement in the hub 20 so that they extend diagonally with respect to the shaft 15,—i. e. the inner ends of the pins are separated a greater distance from the shaft 14 than the outer ends and the pins in fact spread inwardly from their outer ends to their inner ends. As these pins 26 are arranged in a circular series and as they extend diagonally instead of parallel with the shaft, they serve to exert a radially inward pressure as they embed themselves in the surface of the wood.

A centering point for the head is arranged at the inner end of one of the shafts which is yieldingly mounted in the inner end thereof. In the preferred adaptation of this feature of the invention as shown in Fig. 13 of the accompanying drawings, it will be noted that the rear end of the shaft 13 which is of the same diameter throughout is provided with a deep longitudinal central end recess 30 in the interior portion of which a coil spring 31 is loosely fitted. A centering pin 32 is slidably fitted in the recess against one end of the coil spring and has a projecting sharpened or conical shaped centering point 33. The centering pin 32 is limited in its outward movement by a set screw 34 which is screwed into the end of the shaft 13 and has an enlarged head which slidably engages in a groove 35 in the side of the centering pin as shown in Fig. 13.

In order to clamp a head in place between the clamping members it is necessary to provide means for moving the heads toward or from each other. In the present adaptation of the invention, as shown in the accompanying drawings, the rear shaft 14 is constructed and arranged so that it will bodily slide in its bearing and thus move the rear clamping member mounted on its inner end toward or from the front clamping member mounted on the front shaft 13. This sliding movement of the rear shaft is accomplished through a series of pivotally connected levers and links, as shown in Fig. 3 in which the position of the links and levers when the movable rear clamping member is in clamping position is shown in full lines and the changed position when in non-clamping position in dotted lines.

Figure 7:
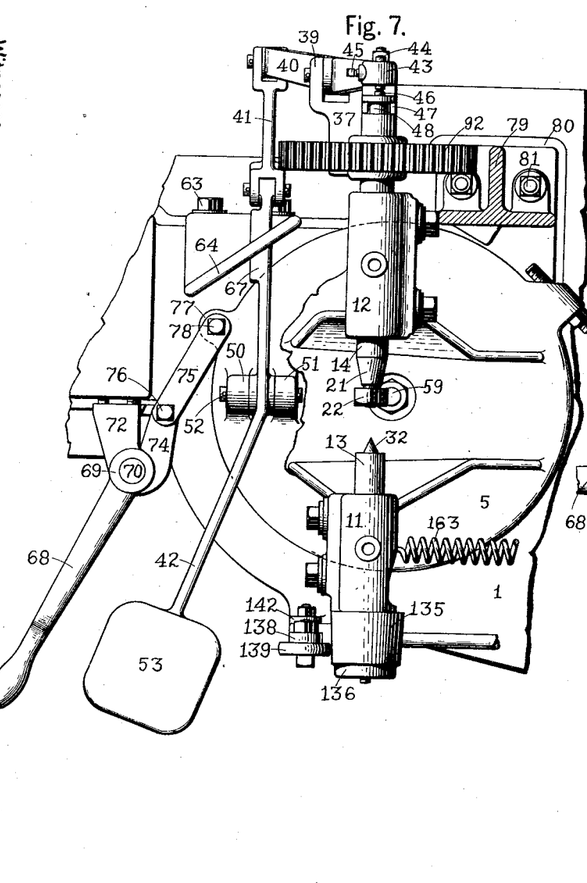
Fig. 7 is a fragmentary top plan view of the central portion of the improved machine with the clamping members of the work supporting mechanism removed, the cutting mechanisms and their supports being omitted and the driving mechanism being also omitted, a horizontal section being taken through the supporting standard of the driving mechanism on line A—A Fig. 4, to leave the lower portion of the standard and show the stop for the work supporting table, and the work supporting table being shown in locked operating position.
Figure 8:
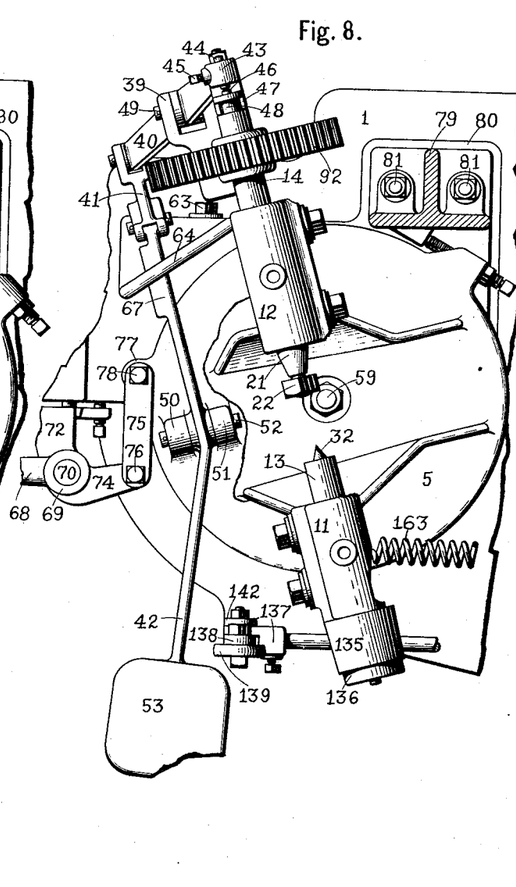
Fig. 8 is a fragmentary top plan view of the central portion of the improved machine with the clamping members of the work supporting mechanism removed, the cutting mechanisms and their supports being omitted and the driving mechanism being also omitted, a horizontal section being taken through the supporting standard of the driving mechanism on line A—A Fig. 4, to leave the lower portion of the standard and show the stop for the work supporting table, and the work supporting table and its parts and levers turned from the position shown in Fig. 7 to a non-engaging position.

As the tapering vertical members 9 and 10 of the table of the work supporting mechanism are located at and project up from approximately the front and rear thereof as shown in Fig. 1, they will be hereinafter designated as the front vertical member 9 and the rear vertical member 10 and the bearing or journal box 11 located at the upper end of the front vertical member 9 will be hereinafter designated as the front bearing or journal box, and the bearing or journal box 12 located at the upper end of the rear vertical member will be hereinafter designated as the rear bearing or journal box. Now referring to Fig. 3 it will be noted that the rear vertical member 10 is provided with a horizontal rearwardly extending portion 36 which is provided with a slideway in which a pivot block 37 is adjustably fastened by a bolt 38. The pivot block is provided with a bifurcated or forked rear portion 39 as shown in Figs. 1, 3, 7 and 8. The pivotally connected levers and links are preferably three in number consisting of a rear lever 40 which is in a vertical position when the clamping members are in clamping position as shown in Fig. 3 and slightly out of a vertical position when the clamping members are spread from each other, an intermediate connecting link 41 and a forwardly extending angular foot lever 42. The rear vertical lever 40 has an enlarged eye portion 43 at its upper end in which a hardened pin 44 is adjustably fitted and secured by a set screw 45, see Fig. 1. The front end of the hardened pin 44 is arranged to contact with and press against a similar hardened pin 46 fitted in the rear end of the rear shaft 14. The vertical lever 40 is loosely connected to the rear end of the rear shaft by an angular bracket 47 which is bolted to the vertical lever 40 near the upper end thereof and has an angular bifurcated or forked upper portion which is arranged in inverted position astride a peripherally grooved or recessed portion 48 near the rear end of the rear shaft 14 as shown in Figs. 1, 3 and 4. The vertical lever 40 is pivoted between the forks of the bifurcated rear portion 39 intermediate its ends by a pivot pin 49 as shown in Fig. 3. The link 41 is pivoted at its opposite ends to the lower end of the rear vertical lever 40 and the rear end of the angular foot lever 42 respectively. The angular foot lever 42 extends forward from its pivotal connection with the link 41 and is fulcrumed at an intermediate portion between a pair of separated upwardly projecting ears 50 and 51 extending up from the base of the table by a pivot pin 52 as shown in Figs. 7 and 8. A broad flat foot supporting plate 53 is located at the front end of the lever as shown in Figs. 7 and 8.

The connecting levers and links together with the rear shaft 14 and its clamping member are normally held in a non-clamping position and are automatically returned to a non-clamping position from a clamping position when the foot lever is released by a spring or other suitable means. Preferably a simple spirally coiled spring is employed for this purpose, such as the spring 54 shown in Fig. 3 which loosely encircles a bar 55 slidably fitted through an opening in a depending portion 56 of the pivot block 37 and an opening in the rear vertical lever 40 slightly below the point at which said lever 40 is pivoted to the pivot block 37. Nuts 57 and 58 are screwed on the respective opposite ends of the screw bar and the coil spring 54 which is of the expansion type is held between the nut 57 at the forward end of the bar and the depending portion 56. As the tendency of the spring is to expand necessarily the rear end of the bar is pulled forward with a spring tension which causes the rear vertical lever to turn from the position shown in full lines in Fig. 3 to the position shown in dotted lines in said Fig. 3.

The base of the table is fastened to the base of the machine frame by a vertical screw bar 59 which passes centrally through an opening in the table base and has its lower end screwed into a screw threaded socket 60 in the machine base as shown in Fig. 6. The upper portion of the central opening through the table base is enlarged and counter bored as shown at 61 in Fig. 6 and two lock nuts are fitted on the upper projecting end of the bar 59 which are located in the enlarged counter bored opening 61.

A self locking device is provided for positively holding the movable clamping member in its clamping position. Preferably the locking device is in the form of an angular bracket the lower portion 62 of which is fastened in stationary position to the base of the machine frame by bolts 63 in the rear and slightly to one side of the table of the work supporting mechanism as shown in Fig. 4 and the upper portion 65 of which projects vertically up from the lower portion and is provided with an angular slot having a horizontal upper portion 65 and a vertical portion 66 extending downwardly from one end of the horizontal portion substantially as shown in said Fig. 4. The upper portion 65 is arranged diagonally as shown in Figs. 2, 3, 4, 7 and 8 and the lower foot lever 42 is fitted through the slot as shown in said figures and is adapted to rest in the lower part of the vertical portion 66 of the angular slot as shown in dotted lines in Fig. 3 when the work supporting mechanism is turned to hold the work out of cutting contact or diagonally in the machine as shown in Fig. 8 and the clamping members are in a spread non-clamping position. When the foot lever 42 is depressed, its intermediate portion, fitted through the slot in the bracket which is provided with upper and lower edge flanges 67 to form broader wearing surfaces, is raised from the position shown in dotted lines in Fig. 3 to the position shown in full lines and is automatically shifted and locked against downward movement in the upper horizontal portion 65 by the turning of the work supporting mechanism from the non-cutting position shown in Fig. 8 to the cutting position shown in Fig. 7.

Figure 2:
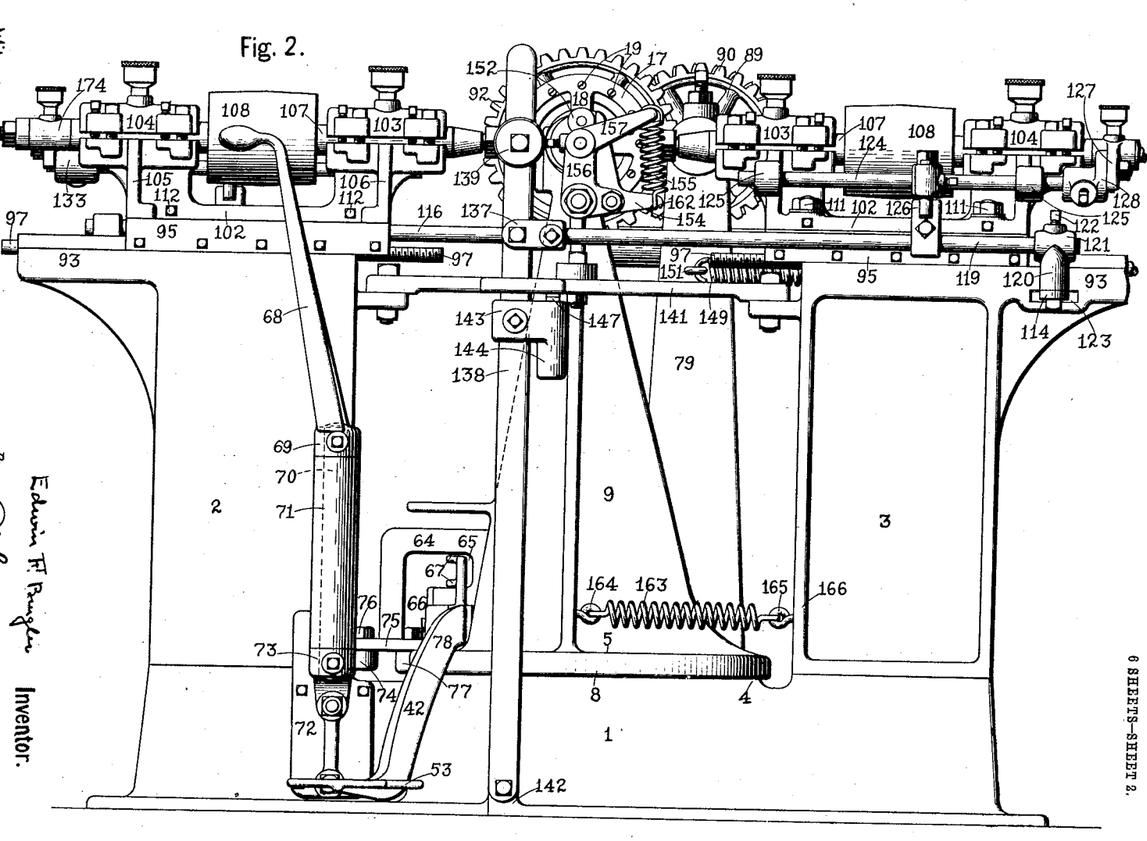
Fig. 2 is a front elevation of the improved shaping machine.

The table of the work supporting mechanism is partially rotated or revolved to swing the work from the non-cutting position in Fig. 8 to the cutting position shown in Figs. 1 and 7 by manually controlled means. Referring to Fig. 2 it will be noted that a hand lever 68 is provided at its rear end with a collar 69 which is rigidly fastened on the upper end of a bar 70 which is journaled in a vertical bearing 71 formed in a bracket or lug 72 extending from the machine frame as shown in Fig. 2. A collar 73 is also attached to the lower end of the bar 70 and is provided with a laterally extending arm or crank 74 which is pivoted at its outer end to one end of a link 75 by a pivot pin 76. The opposite or rear end of the link 75 is pivoted to a lateral lug 77 on the table of the work supporting mechanism by a pivot pin 78. The table of the work supporting mechanism is partially rotated or swung in a clockwise direction from the non-cutting position shown in Fig. 8 to the position shown in Fig. 7 by the operator or workman grasping the hand lever and pulling it forward from the position shown in Fig. 8 to the position shown in Fig. 7.

*Means for revolving the work supporting mechanism.*—The work supported by the work supporting mechanism is revolved when in cutting and shaping position so that all parts of the edge of the work will be cut and shaped. This is preferably accomplished by means of a system of gearing which automatically connects with and rotates one of the horizontal shafts of the work supporting mechanisms when the table is turned on its bearing to bring the work in cutting position. The preferable construction of this feature of the improved machine is illustrated in Figs. 1, 2, 3, 4, 7 and 8 and is perhaps best shown in Fig. 4. A vertical standard or frame member 79 is firmly bolted at its lower end to a rear extension 80 of the machine base by bolts 81. The standard is located in the rear of the table of the work supporting mechanism and to one side of the center of the machine frame. The top of the standard or frame member is hollowed out to form an oil reservoir 82 and a long horizontal bearing 83 is formed on the reservoir 82 in which a shaft 84 is journaled. A grooved wheel or pulley 85 is mounted on the projecting end of the shaft 84 and a worm wheel 86 is mounted on an intermediate portion of said shaft, a suitable portion of the bearing 83 being cut away to allow the interposition of the worm wheel. The worm wheel is arranged to run in the lubricant 87 in the reservoir 82 as shown in Fig. 4. A stationary non-rotatable bar or shaft 88 is mounted in the upper end of the standard 79 being arranged in a plane above the shaft 84 and at a right angle to said shaft, and a worm gear 89 enmesh with the worm gear 86 is rotatably mounted at one end of the stationary shaft. A wide pinion 91 which is preferably formed integral with the gear wheel 89 is rotatably mounted on the opposite end of the shaft 88 as shown in Fig. 1 and is adapted to mesh with a gear wheel 92 mounted on the rear shaft 14 of the work supporting mechanism when the work supporting mechanism is shifted or turned to the position shown in Figs. 1, 2 and 7.

*The cutting mechanism.*—In the form of the machine illustrated, two cutting mechanisms, each of which is arranged diagonally opposite the other, are employed. These cutting mechanisms are mounted on the vertical supporting portions 2 and 3 and on opposite sides of the work supporting mechanism as shown in Fig. 1 and as they are of identical construction with the exception that they are opposed to each other, a detail description of one, it is thought, should suffice for both.

Figure 9:
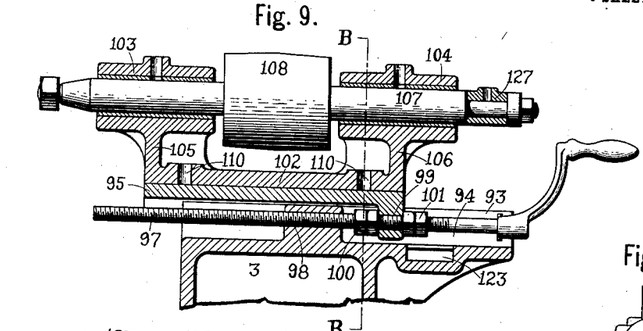
Fig. 9 is an enlarged detached central vertical section through the carriage of one of the cutting mechanisms.
Figure 10:
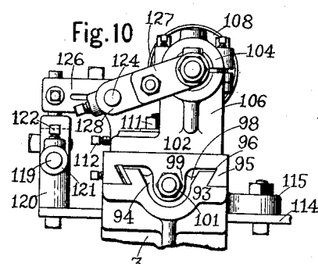
Fig. 10 is an enlarged detached end view of the carriage of one of the cutting mechanisms.
Figure 11:
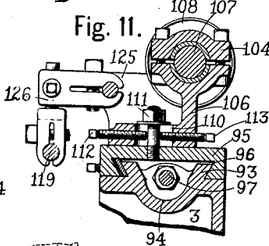
Fig. 11 is a transverse vertical section through the carriage of the cutting mechanism on line B—B Fig. 9.

For details of the cutting mechanism reference is to be had to Figs. 1, 2, 9, 10 and 11. Referring to Figs. 10 and 11 it will be seen that both of the supporting portions 2 and 3 are provided on their top surface with a longitudinally extending raised rib or guide 93 which is hollowed out or concaved on its top surface as shown at 94 in Figs. 9, 10 and 11 for a purpose to be hereinafter explained. The rib or guide 93 is in the form of a reversed wedge, and a plate 95 is fitted on the top surface of each of the supporting portions which is provided on its under surface with a groove 96 of corresponding wedge shape in which the rib or guide 93 slidably dovetails, see Figs. 10 and 11. The plate 95 is moved longitudinally on the raised rib or guide by a screw bar 97 which passes through a screw threaded opening in a cross web 98 in the concavity 94. The screw bar also passes loosely through an opening in a depending portion 99 located at one end of the plate in which it is rotatably supported. To prevent longitudinal movement of the screw bar 97 in the depending portion 99 lock nuts 100 and 101 are screwed on the screw bar on opposite sides of the depending portion as shown in Fig. 9.

The carriage for the cutting mechanism is mounted on the plate 95 and is so arranged that it is adjustable at a right angle to the adjustment of the plate 95 on the frame portion or transversely across the machine. Referring to Fig. 9 the carriage preferably consists of a base 102 and two bearings 103 and 104 in separated arrangement located above the base and supported from said base by short vertical standards 105 and 106. The bearings 103 and 104 extend horizontally in alinement with each other as shown in Fig. 9. A cutter shaft 107 is journaled in the bearings 103 and 104 and a pulley 108 is mounted thereon being located between the bearings see Figs. 1 and 9. A cutter head 109 of any preferred type is mounted on the inner end of the cutter shaft as shown in Fig. 1. The transverse adjustment of the carriage on the plate 95 is due to the transverse slots 110 formed in the carriage through which screw bolts 111 are fitted and screwed into vertical openings in the plate 95. Two set screws 112 and 113 are screwed in horizontal openings in the carriage base 102 and are arranged in exact alinement with each other, extending transversely of the carriage and bearing with their inner ends against opposite sides of one of the screw bolts 111. It will thus be seen that the carriage together with the cutter shaft and cutter head can be manually adjusted transversely of the machine independently of the plate 95 and also manually and independently adjusted longitudinally of the machine in conjunction with the plate 95.

*Means for varying the form of the work.*— Besides the manually operated transverse and longitudinal adjustments of the carriage of the cutting mechanism, the cutter shafts are connected together so that they are simultaneously and correspondingly adjusted in a longitudinal direction in their bearings. The purpose of this adjustment is to provide means for cutting the head slightly out of round,—that is, in a slightly elliptical or cylindraceous form to compensate for the irregularity of shrinkage in the wood of the head as it dries. The preferred construction of the means connecting the cutter shafts is illustrated in Figs. 1 and 2. Referring to Fig. 1, a transverse lever 114 is pivoted centrally to an ear 115 extending rearwardly from the right hand or outer rear corner of the carriage of the cutter mechanism located on the right of the machine frame. A long longitudinal bar 116 is arranged in the rear of the carriages and has its right end provided with a depending block 117 which has an upper collar portion fastened by a set screw 118. The rear extremity of the transverse lever 114 is pivoted to the lower end of the block 117. A longitudinal bar 119 is arranged in the front of the machine which is considerably shorter than the bar 116 and extends in front of the right hand cutter mechanism and the work supporting mechanism only. The bar 119 is provided at its right end with a depending block 120 that has a collar 121 in which the bar end fits and is fastened by a set screw 122. The forward portion of the transverse lever 114 fits loosely through a transverse slot 123 in the machine frame which is made sufficiently wider than the lever to allow for the necessary adjusting movement of the lever, as shown in Fig. 2, and said lever is pivoted at its forward end to the lower end of the depending block 120. The front longitudinal bar 119 is connected to a longitudinal slide bar 124 which is slidably mounted in forwardly extending brackets 125 attached to the carriage of the right hand cutter mechanism by an angular clamp member 126 and the slide bar 124 is in turn coupled to the cutter shaft of the right hand cutter mechanism by a two part pivotally jointed transverse connection, one of the parts 127 of which is fastened to the outer or right hand extremity of the cutter shaft and the other part 128 of which is fastened to the corresponding extremity of the slide bar 124, as shown in Figs. 1 and 2. The left hand extremity of the long rear longitudinal bar 116 is slidably supported in a rearwardly extending bracket 129 attached to the carriage of the left hand cutter mechanism and said bar 116 is connected to a slide longitudinal bar 130 slidably mounted in rearwardly extending brackets 131 by an angular clamp member 132 similar to the member 126 shown in Figs. 1 and 2. The slide bar 130 is in turn coupled to the cutter shaft of the left hand cutter mechanism by a two part pivotally jointed transverse connection which has one of its parts 133 fastened to the cutter shaft and its other part 134 fastened to the slide bar, as shown in Fig. 1. The connected longitudinal rods and transverse lever are automatically moved by roller mechanism to simultaneously and correspondingly shift the two cutter shafts to vary the circumferential cutting curve and thereby vary the cylindraceous form of the finished head.

Figure 15:
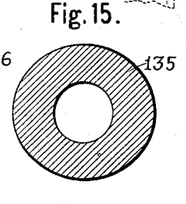
Fig. 15 is a transverse section through the cam on line C—C Fig. 14.
Figure 16:
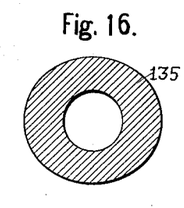
Fig. 16 is a transverse section through the cam on line D—D Fig. 14.
Figure 17:
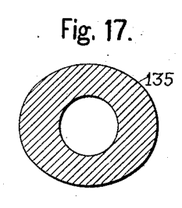
Fig. 17 is a transverse section through the cam on line E—E Fig. 14.

Referring to Figs. 1, 2, 3, 7 and 8 a large wide tapering roller 135 is rigidly mounted on the front end of the front or idle shaft 13 of the work supporting mechanism and is provided with a tapering peripheral surface of cylindraceous form, which varies from the perfect cylindrical shape at its larger and rear end, toward its front end, gradually changing from a cylindrical form in cross section to the rounded oblong form shown in Fig. 17. The reduced smaller and front end 136 of the roller is also of a perfect cylindrical form. The object in forming the roller 135 in this peculiar shape is to provide means for cutting the head slightly out of round to compensate for the shrinkage of the material in drying. Other cross sectional forms of the roller 135 are shown in Figs. 15 and 16 to illustrate the difference in the elliptical character of the roller. The variations in form of the roller are also shown in dotted lines in Fig. 5. Hereinafter the roller 135 will be referred to as the large tapering cylindraceous roller or in some parts as simply the large roller to distinguish it from other rollers. The left hand extremity of the front longitudinal bar 119 is connected by an enlarged end block 137 to a vertical lever 138 which carries a small narrow roller 139 which rotatably contacts with the peripheral surface of the large wide cylindaceous roller 135, as shown in Fig. 5. The lever 138 extends through a transverse vertical slot 140 in a horizontal bracket 141 attached to the inner side of the vertical frame extension 3 and is pivoted at its lower end to a lug 142 extending upward from the machine base.

Figure 12:
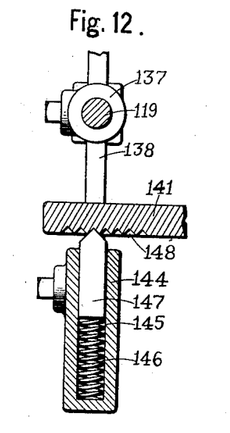
Fig. 12 is an enlarged fragmentary view partially in section to show the frictional lock for the cam for controlling the form of the cutting curve.

The lever 138 is shifted transversely in the slot 140 to move the small narrow roller 139 longitudinally across the peripheral face of the large wide tapering cylindraceous roller and thus change or vary the circumferential contour of the cutting curve. Means is provided for frictionally locking the lever 138 in its adjusted position which preferably comprises a block 143 adjustably fastened on the lever 138 and having a vertical depending enlargement 144 which is hollowed out to provide a vertical chamber 145 in the lower portion of which a spiral spring 146 is placed as shown in Fig. 12. A vertical pin 147 is slidably mounted in the upper portion of the chamber 145 and upon the spring 146 and has a conical upper end which is adapted to be forced up into any one of a series of V-shaped recesses 148 cut in the under surface of the bracket 141 attached to the machine frame substantially as shown in Fig. 12. The small narrow roller 139 is held against the peripheral surface of the large wide roller 135 by the tension of a long spiral spring 149 one end of which is attached at one end to a collar 150 fitted on the shaft 116 the other end being fastened to an eye 151 on the vertical standard 79 as shown in Figs. 1 and 2.

The front or idle shaft 13 of the work supporting mechanism is provided with a frictional stopping mechanism which preferably consists of two rollers 152 rotatably mounted on pins 153 extending from the front end of roller 135 on opposite sides of the center thereof and a pivoted arm 154 which is yieldingly forced against the rollers 150 and 151 by the tension of a spring 155.

Referring to Fig. 5, it will be observed that an angular bracket 156 is fastened to the machine frame and has laterally extending upper and lower arms 157 and 158. The arm 154 which is preferably in the form of a bell crank is pivoted at or near its bend to the lower lateral arm 158 by a pivot bolt 159. The side surface 160 of the upper portion of the arm 154 which bears against the rollers 150 and 151 is of an angular form as shown in Fig. 5. The tensioning spring 155 has its upper end hooked over a lateral pin 161 at the outer extremity of the upper arm 157 and its lower terminal hooked on the notched lower end of the arm 154 as shown at 162 in Fig. 5. When the clamping members of the work supporting mechanism are in clamping position and the shafts thereof are slowly revolving, the arm 154 is rocked under the tension of the spring 155 and the pressure of the rollers 150 and 151 swinging to and fro from the position shown in full lines to the position shown in dotted lines in Fig. 5. When the table of the work supporting mechanism is returned to an inoperative position and the rear driven shaft 14 is moved out of meshing engagement with the revolving gear mechanism, the rotation of the front idle shaft 13 is almost instantly stopped by the pressure of the arm 154 against the rollers 150 and 151 and said front shaft is held against involuntary rotation by the tension of the spring 155.

A spring 163 is employed to automatically return the work supporting mechanism to an inoperative non-cutting position when said work supporting mechanism is released, said spring being arranged horizontally and having one end fastened to an eye screw 164 attached to the vertical frame extension 2 and its opposite end fastened to a similar eye screw 165 attached to a vertical rib 166 of one of the vertical members of the work supporting mechanism, as shown in Fig. 2. It will also be observed that the top surface of the base of the table is made slanting as shown in Fig. 6 for the purpose of guiding the sawdust and small particles of wood to one side of the machine.

*Operation.*—The operation of the present type of my improved machine as shown in the accompanying drawings and comprehensively set forth in the foregoing description is as follows:—A suitable article to be cut and finished such as a barrel head is held by the operator in central position between the clamping members as shown in Fig. 3 and the foot lever 42 is forced downward from the position shown in dotted lines in Fig. 3 to the position shown in full lines in said Fig. 3. This downward movement of the foot lever rocks the vertical shaft 40 and moves the rear shaft 14 longitudinally in its bearings and transversely forward, moving the rear clamping member toward the front clamping members and clamping the work firmly between the clamping members. The operator now grasps the hand lever 68 and pulls it forward from the position shown in Fig. 8 to the position shown in Figs. 1, 2 and 7 which swings the table of the work supporting mechanism horizontally on its axis from the diagonal position shown in Fig. 8 to the transverse position shown in Figs. 1, 2 and 7 and brings one corner of the circumferential edge of the barrel head in cutting contact with the cutter head of one of the cutter mechanisms and the opposite corner of the circumferential edge in cutting contact with the opposite cutter head. The swing movement of the table also moves the foot lever in locking engagement with the bottom wall of the upper horizontal portion 64 of the angular slot in the stationary bracket and automatically locks the rear movable clamping member in its clamping position, as shown in Fig. 3. Likewise the gear wheel 92 mounted on the rear shaft 13 is brought into meshing contact with the pinion 91 by the swing movement of the table and the shaft 13 is started slowly revolving. Now referring to Fig. 8 it will be noted that the small narrow roller 139 is entirely out of contact with the large roller 135 when the work supporting mechanism is in an inoperative non-cutting position and that the swinging of the said work supporting mechanism in cutting proximity relatively to the cutter mechanism brings the roller 139 in contact with the roller 135 as shown in Figs. 1, 2, 3, 5 and 7. The work supporting mechanism is held in its operative position in cutting proximity to the cutter mechanism by the hand of the operator or workman on the hand lever 68 and is retained in said cutting position until the head is properly cut. The hand lever 68 is then released by the operator and the tension of the spring 163 automatically swings the table of the work supporting mechanism away from the cutter mechanism or from the position shown in Fig. 7 to the inoperative position shown in Fig. 8. The return movement of the work supporting mechanism disengages the gear wheel 92 from meshing engagement with the pinion 91 moves the roller 139 out of contact with the roller 135 and shifts the foot lever 42 out of the horizontal portion 64 of the slot and permits the spring 54 to automatically spread the clamping members and release the finished head.

The various adjustments of the parts and elements will be clearly understood from the foregoing description and the accompanying drawings.

I claim,—

1. In a machine of the class described, a machine frame having a low base of an elongated angular form provided with a short central raised portion, and vertical supporting portions projecting up from the opposite ends of the base, cutter mechanisms supported in parallel non-alined position from the vertical supporting mechanism and clamping mechanism pivotally mounted on the short central raised portion of the machine frame and in interposed position between the cutter mechanisms.

2. In a machine of the class described, two diagonally opposed cutter mechanisms having cutters in separated parallel planes constructed and arranged to cut on opposite sides of the peripheral edge of the work and work supporting mechanism located between said opposed cutter mechanisms and adapted to be moved to simultaneously bring the work in cutting position with both cutter mechanisms.

3. In a machine of the class described, two diagonally opposed cutter mechanisms having cutters in separated parallel planes constructed and arranged to cut on opposite sides of the peripheral edge of the work and at points diagonally opposite each other and work supporting mechanism located between said opposed cutter mechanisms and adapted to be moved to simultaneously bring the work in cutting position with both cutter mechanisms.

4. In a machine of the class described, two diagonally opposed cutter mechanisms having cutters in separated parallel vertical planes constructed and arranged to cut on opposite sides of the peripheral edge of the work and work supporting mechanism located between said opposed cutter mechanisms and adapted to be moved horizontally in a curved path to simultaneously bring the work in cutting position with both cutter mechanisms and to be rotated slowly while in said cutting position.

5. In a machine of the class described, a machine frame having a low base provided with a central raised portion and comparatively high vertical end extensions arranged out of longitudinal alinement with other, work supporting mechanism having a swing table pivotally mounted on the central raised portion, opposed longitudinally alined shafts journaled in the swing table and carrying clamping members at their inner ends and cutter mechanisms each mounted on one of the vertical end extensions.

6. In a machine of the class described, the combination with cutter mechanism, of work supporting mechanism movable relatively to the cutter mechanism and provided with opposed clamping members; each of said clamping members having a series of points arranged in a circle and adapted to embed themselves in the surface of the article clamped between the clamping members, one of said series of points being considerably larger and longer than the points of the other series, and means for circumferentially contracting said larger and longer series as the article is clamped between the clamping members.

7. In a machine of the class described, the combination with cutter mechanism, of work supporting mechanism movable relatively to the cutter mechanism and provided with opposed clamping members; said clamping members each having a set of points adapted to embed themselves in the surface of the article clamped between the clamping members and the points of one of said sets being considerably larger and longer than the points of the other set and being yieldingly mounted in one of the clamping members and extending at an obtuse angle to the face of said clamping member, said obtuse angled points being adapted to be forced inwardly in the face of the clamping member as an article is clamped between said clamping members.

8. In a machine of the class described, the combination with cutter mechanism, of work supporting mechanism movable relatively to the cutter mechanism and provided with opposed clamping members; said clamping members each having a set of points adapted to embed themselves in the surface of the article clamped between the clamping members and the points of one of said sets being considerably larger and longer than the points of the other set and being yieldingly mounted in one of said clamping members and extending at an obtuse angle to the face of said clamping member and said points having sharpened ends provided with fairly wide flattened and concaved surfaces on their inner sides.

9. In a machine of the class described, the combination with cutter mechanism, of work supporting mechanism movable relatively to the cutter mechanism and provided with opposed clamping members; each of said clamping members having a series of points adapted to embed themselves in the surface of the article clamped between the clamping members and the points of one of said sets being yieldingly arranged in annular form in the clamping member with their embedding ends extending diagonally outward or at an obtuse angle to the face of the clamping member, whereby the circular formation of the embedding ends is circumferentially contracted as the yieldingly mounted points are forced inwardly in the clamping member.

10. In a machine of the class described, two opposed cutter mechanisms in separated position, having parallel non-alined shafts and cutter heads at the inner ends of said shafts and work supporting mechanism located between said opposed cutter mechanisms and adapted to be moved to bring the work in cutting position with both cutter mechanisms simultaneously; said work supporting mechanism having shafts in longitudinal alinement with each other and clamping members at the separated inner ends of said shafts.

11. In a machine of the class described, two opposed cutter mechanisms in separated position, having parallel non-alined shafts and cutter heads at the inner ends of said shafts and work supporting mechanism located between said opposed cutter mechanisms and adapted to be moved to bring the work in cutting position with both cutter mechanisms simultaneously; said work supporting mechanism having shafts in longitudinal alinement with each other and clamping members at the separated inner ends of said shafts, and the shafts of the work supporting mechanism extending at right angles with the shafts of the cutter mechanism when the work is held in cutting position.

12. In a machine of the class described, two diagonally opposed cutter mechanisms, work clamping and supporting mechanism located between the two cutter mechanisms and constructed and arranged to have a swing movement relatively to the cutter mechanism, and an independent clamping movement, a hand lever controlling the swing movement, and a foot lever controlling the clamping movement.

13. In a machine of the class described, two diagonally opposed cutter mechanisms, work clamping and supporting mechanism located between the two cutter mechanisms and constructed and arranged to have a swing movement relatively to the cutter mechanism, and an independent clamping movement, a horizontally movable hand lever controlling the swing movement and a vertically movable foot lever controlling the clamping movement, and a lock for holding the foot lever in its clamping position comprising a slotted block through the slot of which the foot lever loosely passes.

14. In a machine of the class described, two diagonally opposed cutter mechanisms, work clamping and supporting mechanism located between the two cutter mechanisms and constructed and arranged to have a swing movement relatively to the cutter mechanism, and an independent clamping movement, a horizontally movable hand lever controlling the swing movement and a vertically movable foot lever controlling the clamping movement and a lock for holding the foot lever in its clamping position comprising a block having an angular slot through which the foot lever loosely passes; said slot consisting of a horizontal upper locking portion and a vertical portion extending downward from one end of the upper portion.

EDWIN F. BEUGLER.

Witnesses:
 K. A. LANDIS,
 CARL SCHRAMM.

Copies of this patent may be obtained for five cents each, by addressing the "Commissioner of Patents, Washington, D. C."